United States Patent
Turk et al.

(10) Patent No.: US 6,505,320 B1
(45) Date of Patent: Jan. 7, 2003

(54) MULTIPLE-RATE CHANNEL ENDEC IN A COMMUTED READ/WRITE CHANNEL FOR DISK STORAGE SYSTEMS

(75) Inventors: Stephen A. Turk, Longmont, CO (US); Christopher P. Zook, Longmont, CO (US); Marvin L. Vis, Longmont, CO (US)

(73) Assignee: Cirrus Logic, Incorporated, Austin, TX (US)

( * ) Notice: Subject to any disclaimer, the term of this patent is extended or adjusted under 35 U.S.C. 154(b) by 0 days.

(21) Appl. No.: 09/521,554

(22) Filed: Mar. 9, 2000

(51) Int. Cl.$^7$ .......................... H03M 13/29; G11B 20/18
(52) U.S. Cl. .................... 714/755; 341/59; 714/769
(58) Field of Search ........................ 714/755, 769; 341/59

(56) References Cited

U.S. PATENT DOCUMENTS

| | | | |
|---|---|---|---|
| 4,804,959 A | | 2/1989 | Makansi et al. ............... 341/59 |
| 5,220,568 A | * | 6/1993 | Howe et al. ................... 341/59 |
| 5,257,270 A | * | 10/1993 | Hilden et al. ................. 341/59 |
| 5,271,016 A | * | 12/1993 | Hilden et al. ................. 341/59 |
| 5,311,521 A | | 5/1994 | Fitingof et al. ............. 714/755 |
| 5,574,448 A | | 11/1996 | Weng et al. ................... 341/59 |
| 5,635,933 A | | 6/1997 | Fitzpatrick et al. ........... 341/58 |
| 5,757,294 A | | 5/1998 | Fisher et al. .................. 341/57 |
| 5,784,010 A | | 7/1998 | Coker et al. .................. 341/61 |
| 6,009,549 A | | 12/1999 | Bliss et al. .................. 714/769 |
| 6,201,485 B1 | * | 3/2001 | McEwen et al. ............... 341/59 |
| 6,288,655 B1 | * | 9/2001 | Tsang et al. ................. 341/119 |

FOREIGN PATENT DOCUMENTS

EP   0 933 768   8/1998

OTHER PUBLICATIONS

P. Siegel and J. Wolf, "Modulation and Coding for Information Storage", *IEEE Communications Magazine*, pp. 68–86, Dec. 1991.
M. Raghuveer et al. "Coding and Signal Processing for Information Storage", *SPIE*, vol. 2605, pp. 115–126, Oct. 23–24, 1995.
W.G. Bliss, IBM Tech. Discl. Bulletin, "Circuitry for Performing Error Correction Calculations on Baseband Encoded Data to Eliminate Error Propagation," 23(10):4633, IBM Corp., Mar. 1981.
Schouhamer Immink, "A Practical Method for Approaching the Channel Capacity of Constrained Channels," IEEE Trans. on Infor. Theory, 43(5):1389–1399, Sep. 1997.
Siegel and Wolf, "Modulation and Coding for Information Storage," IEEE Comm. Mag., pp. 68–86, Dec. 1991.
"Coding and Signal Processing for Information Storage," Proc. of SPIE, The Internat'l. Soc. for Optical Eng., vol. 2605, p. 115–126, Oct. 23–24, 1995, Raghuveer et al., eds.
Search Report dated Nov. 19, 2001, PCT/US01/07616 in the name of Cirrus Logic, Inc.

* cited by examiner

*Primary Examiner*—Stephen M. Baker
(74) *Attorney, Agent, or Firm*—Dan Shifrin (57) ABSTRACT

A sampled amplitude read channel is disclosed for writing data to and reading data from a disk storage medium. A first channel encoder encodes a first j-k bits of a j-bit data block to generate first encoded data, and an ECC encoder encodes the first encoded data and a remaining k-bits of the data block to generate ECC redundancy symbols comprising a plurality of bits. A second channel encoder encodes the remaining k-bits of the data block and the ECC redundancy symbols to generate second encoded data. The first encoded data and the second encoded data are then output as channel data written to the disk storage medium.

28 Claims, 12 Drawing Sheets

MULTIPLE-RATE CHANNEL ENDEC IN A COMMUTED READ/WRITE CHANNEL FOR DISK STORAGE SYSTEMS

CROSS REFERENCE TO RELATED APPLICATIONS AND PATENTS

This application is related to concurrently filed U.S. patent application Ser. No. 09/523,922 entitled "A COST-EFFECTIVE HIGH-THROUGHPUT ENUMERATIVE ENDEC EMPLOYING A PLURALITY OF SEGMENTED COMPARE TABLES." This application is also related to U.S. Pat. No. 6,009,549 entitled "DISK STORAGE SYSTEM EMPLOYING ERROR DETECTION AND CORRECTION OF CHANNEL CODED DATA, INTERPOLATED TIMING RECOVERY, AND RETROACTIVE/SPLIT-SEGMENT SYMBOL SYNCHRONIZATION." The above-identified U.S. patent applications and U.S. patents are incorporated herein by reference.

FIELD OF INVENTION

The present invention relates to communication systems, such as the recording and reproduction of binary data in disk storage systems for digital computers. In particular, the present invention relates to a commuted read/write channel employing a multiple-rate channel encoder/decoder (ENDEC) which increases storage capacity by reducing or eliminating pad bits required in prior art configurations.

BACKGROUND OF THE INVENTION

Disk storage system (e.g., magnetic and optical disk drives) are essentially communication systems wherein the storage medium, head and read/write electronics constitute the communication channel. User data are transmitted through a communication medium by recording the data to the disk during a write operation and sensing the recorded data during a read operation.

Figure 1A:
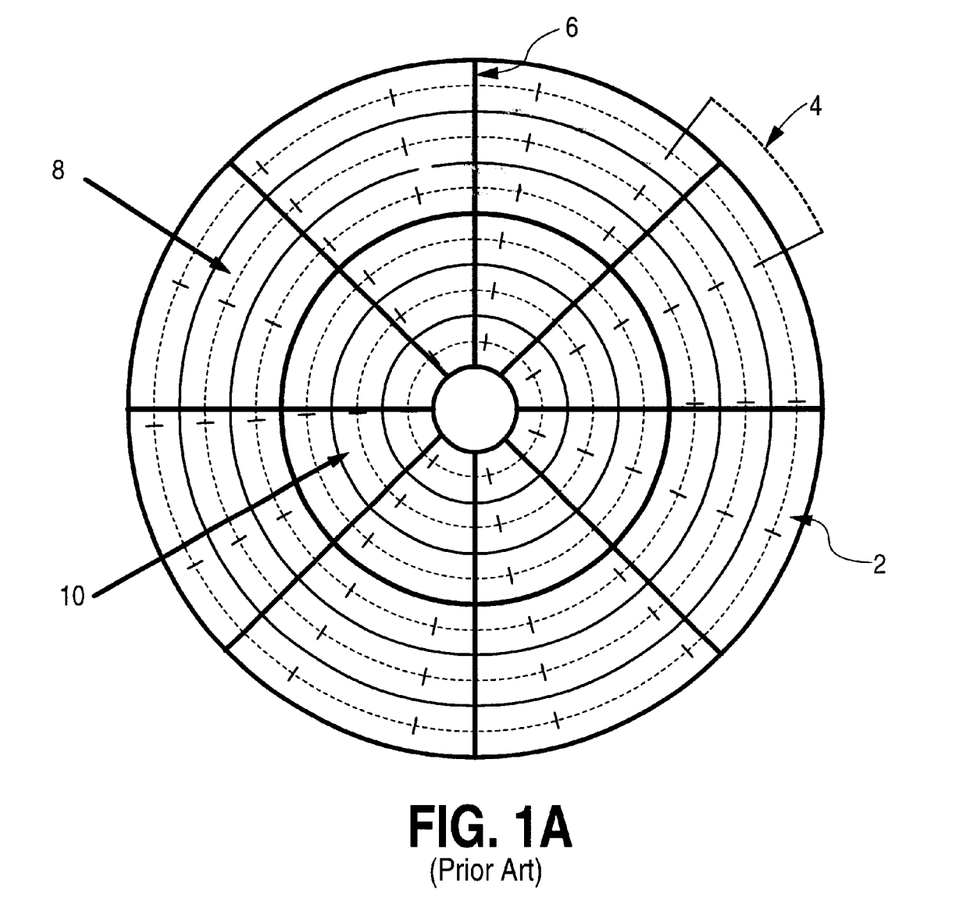
FIG. 1A shows a typical data format for a magnetic disk storage medium, comprising a plurality of concentric data tracks grouped in predefined zones, where each data track is partitioned into a number of data sectors.
Figure 1B:
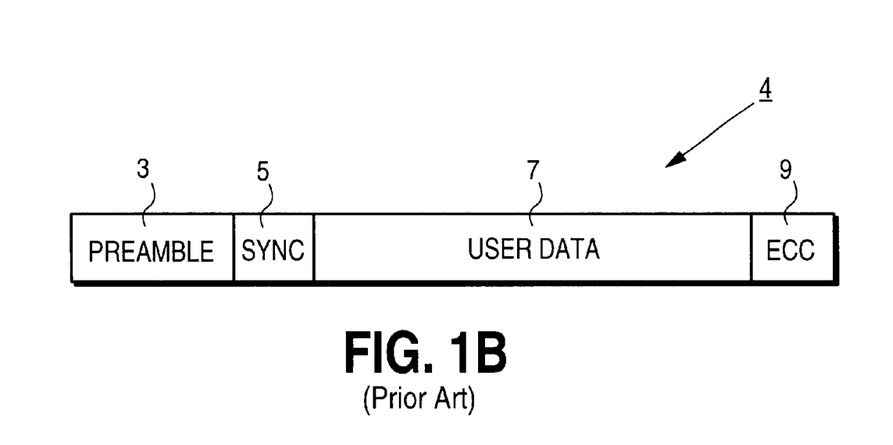
FIG. 1B shows a typical format for a data sector.

FIG. 1A illustrates the typical format of a magnetic disk storage medium comprising a plurality of concentric, radially spaced data tracks 2 partitioned into a number of data sectors 4. A typical format for a data sector 4 is shown in FIG. 1B as comprising a preamble 3 for acquiring the frequency and phase of the recorded data, a sync mark 5 for symbol synchronizing to the recorded data, channel encoded user data 7, and appended ECC redundancy symbols 9 for detecting and correcting errors in the user data. The disk may also include embedded servo sectors 6 which facilitate positioning a head with respect to the disk during write and read operations. In order to achieve a more constant linear bit density, the tracks are typically banded together to form zones and the data rate is increased from the inner to outer diameter zones. This is illustrated in FIG. 1A wherein the disk is partitioned into an inner zone 10 comprising seven data sectors per track and an outer zone 8 comprising fourteen data sectors per track. In practice, the disk is actually partitioned into several zones with the data rate increasing incrementally from the inner to outer diameter zones.

The user data are typically encoded in order to increase the effective signal-to-noise ratio (SNR) which facilitates higher linear recording densities leading to an increase in storage capacity. Two types of codes are typically employed: a channel code and an error correction code (ECC). A channel code typically increases the effective SNR by attenuating a noise source within the recording channel. For example, a run-length limited (RLL) channel code constrains the minimum spacing between consecutive medium transitions representing the recorded data which reduces intersymbol interference. An RLL channel code may also constrain the maximum spacing between consecutive medium transitions in order to reduce errors in bit synchronizing to the data. These two run-length constraints on the minimum and maximum spacing between medium transitions are typically referred to as (d,k) respectively.

A channel code is typically augmented by an ECC code, such as the well known Reed-Solomon ECC code, which increases the effective SNR by encoding the data according to a minimum Hamming distance which defines the correction power of the ECC code. When noise corrupts a transmitted (recorded) codeword, the received codeword can still be successfully decoded as long as the erroneous bits do not violate the minimum Hamming distance.

Figure 2:
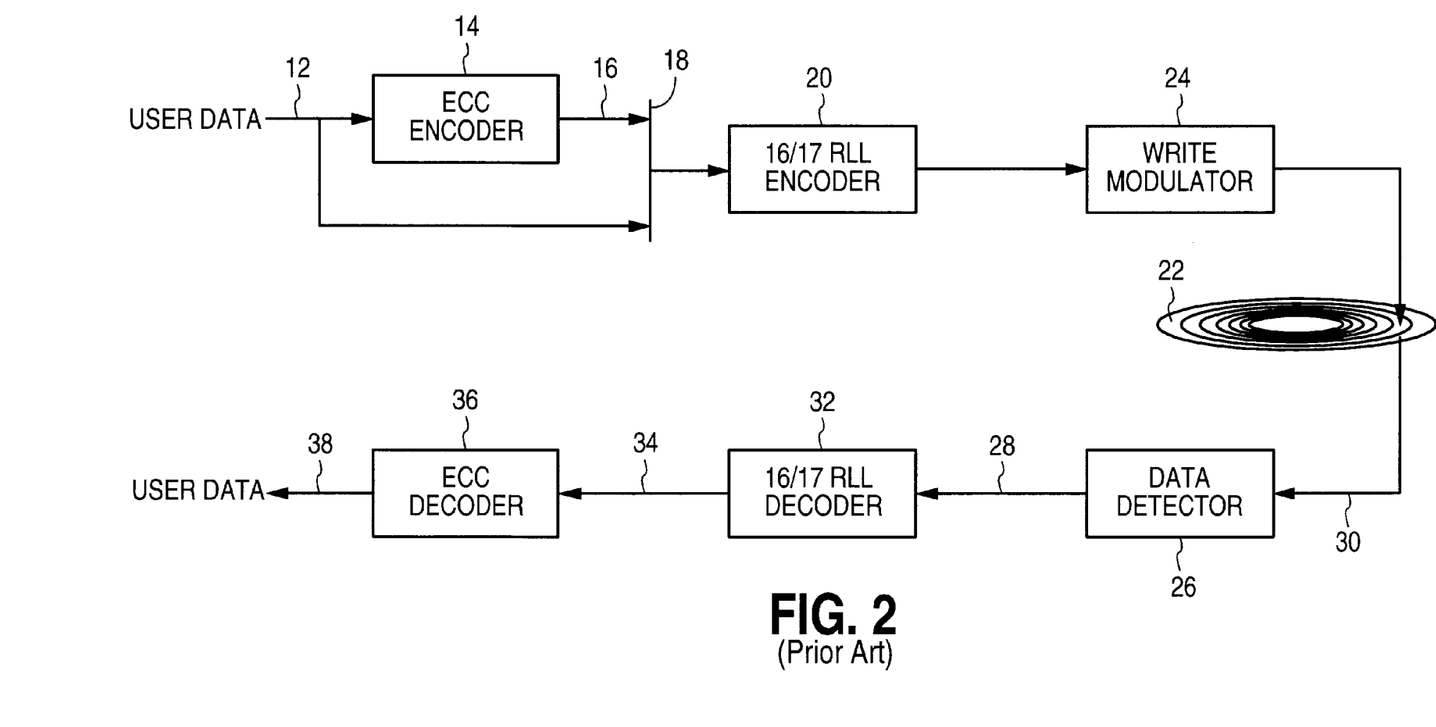
FIG. 2 is a block diagram of a conventional read/write channel wherein the user data is first ECC encoded and then channel encoded (e.g., RLL encoded).

A typical prior art configuration for the channel and ECC encoders/decoders is illustrated in FIG. 2. The user data 12 received from the host are first encoded by an ECC encoder 14 which generates a number of ECC redundancy symbols 16 by dividing the user data represented as a data polynomial by a generator polynomial. The user data 12 are passed through a multiplexer 18 and encoded by a channel encoder 20, such as a rate 16/17 RLL encoder 20, and the encoded user data are written to the disk 22 by a write modulator 24. The ECC redundancy symbols 16 are then passed through the multiplexer 18, encoded by the channel encoder 20, and written to the disk 22 by the write modulator 24. During read back, a data detector 26 detects an estimated data sequence 28 from a read signal 30 emanating from a head (not shown) positioned over a selected track of the disk 22. The estimated data sequence 28 is decoded by a channel decoder 32, such as a 16/17 RLL decoder, which implements the inverse operation of the channel encoder 20. The channel decoded data 34 is then decoded by an ECC decoder 36 into user data 38 transmitted to the host.

The code rate (input-bits/output-bits) of the channel ENDEC shown in the prior art read/write channel of FIG. 2 is typically low in order to minimize the error propagation for the ECC code. For example, when using a rate 16/17 RLL ENDEC with a byte oriented ECC code, an error in RLL decoding 32 a first byte may propagate into a neighboring byte or bytes which must also be corrected by the ECC code. This error propagation problem increases relative to the number of user data bits encoded by the channel encoder, which directly affects the code rate of the channel ENDEC. Thus, the number of user data bits encoded is typically selected to be low in order to reduce error propagation which places an upper bound on the code rate. This is undesirable since a higher code rate allows more user data to be written to the disk.

The code rate limitation of the prior art read/write channel of FIG. 2 is overcome by "commuting" the channel architecture such that the user data is first encoded by the channel encoder, and then encoded by the ECC encoder. This allows for a higher rate channel ENDEC since the error propagation problem is avoided by first ECC decoding the detected data during a read operation, and then passing the ECC corrected data through the channel decoder.

Figure 3:
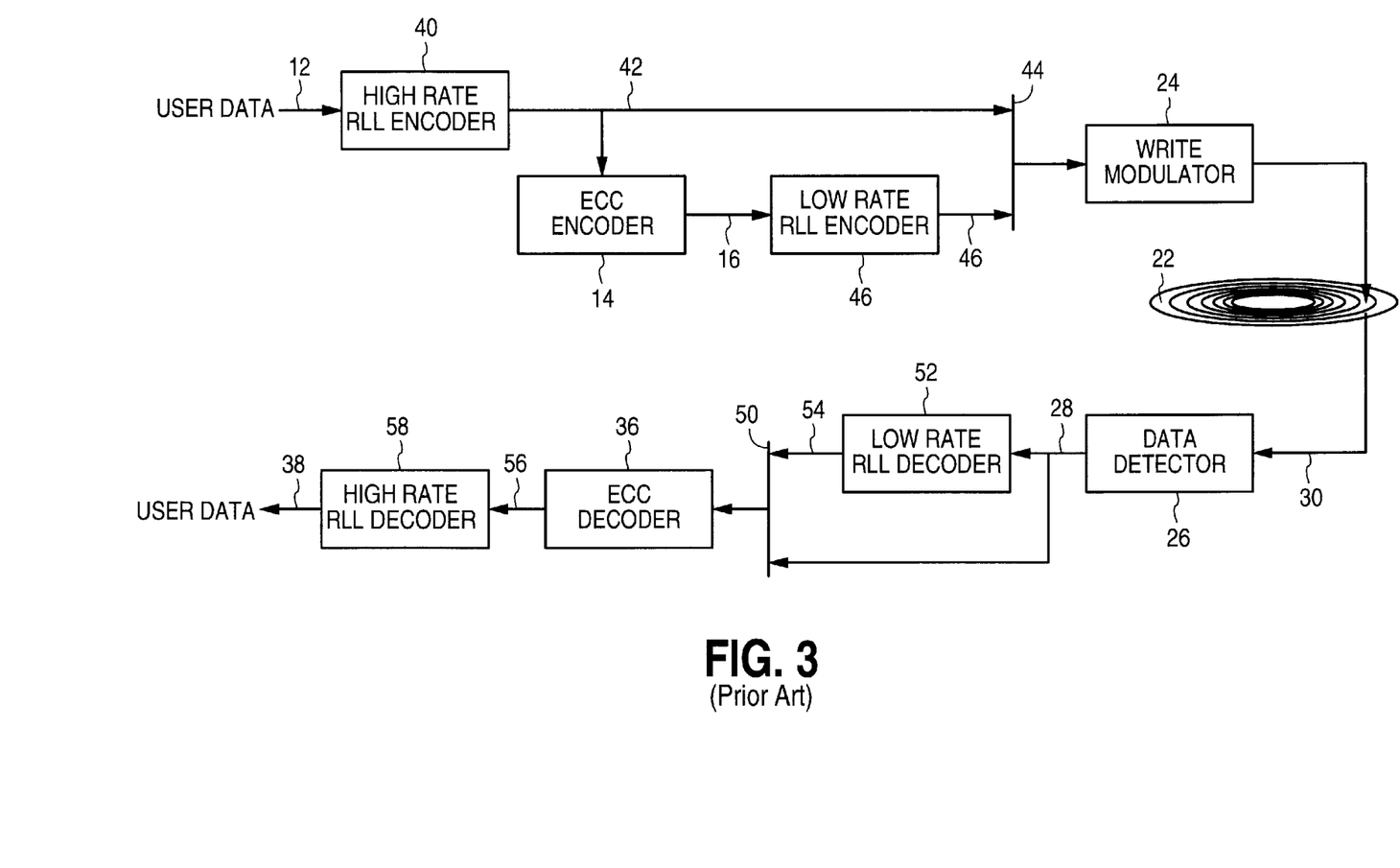
FIG. 3 is a block diagram of a prior art commuted read/write channel wherein the user data are first encoded by a high rate channel encoder, then ECC encoded wherein the ECC redundancy symbols are encoded by a low rate channel encoder.

An example prior art commuted read/write channel is disclosed in the above referenced U.S. patent application entitled "DISK STORAGE SYSTEM EMPLOYING ERROR DETECTION AND CORRECTION OF CHANNEL CODED DATA, INTERPOLATED TIMING RECOVERY, AND RETROACTIVE/SPLIT-SEGMENT SYMBOL SYNCHRONIZATION." The general configuration and operation of the commuted read/write channel disclosed in the aforementioned patent application is illustrated in FIG. 3. The user data 12 received from the host is first encoded by a high rate channel encoder 40, such as a high rate RLL encoder 40. The channel encoded data 42 passes through a multiplexer 44 and is written to the disk 22 by the write modulator 24. The channel encoded data 42 is simultaneously encoded by an ECC encoder 14 which generates the ECC redundancy symbols 16 over the encoded data. The ECC redundancy symbols 16 are then encoded by a low rate channel encoder 46, such as a low rate RLL encoder 46, so that the ECC redundancy symbols 16 satisfy the desired channel constraints when written to the disk 22. The channel encoded ECC redundancy symbols 48 are then passed through multiplexer 44 and written to the disk 22 by the write modulator 24.

During a read operation, the data detector 26 detects an estimated data sequence 28 from the read signal 30. The estimated data sequence 28 representing the user data is passed through a multiplexer 50 and input into the ECC decoder 36. The estimated data sequence 28 representing the encoded ECC redundancy symbols is then decoded by a low rate channel decoder 52, such as a low rate RLL decoder 52, which implements the inverse operation of the low rate channel encoder 46. The decoded ECC redundancy symbols 54 are then passed through multiplexer 50 and input into the ECC decoder 36 which detects and corrects errors in the estimated data sequence 28 representing the user data. The corrected user data sequence 56 is then decoded by a high rate channel decoder 58, such as a high rate RLL decoder 58, which implements the inverse operation of the high rate channel encoder 40. The decoded user data 38 is then transmitted to the host. The error propagation problem inherent in the prior art read/write channel of FIG. 2 is avoided since the estimated data sequence 28 is first corrected by the ECC decoder 36 and then decoded by the channel decoder 58.

Although the prior art commuted read/write channel of FIG. 3 is more efficient by allowing for a higher rate channel ENDEC for encoding/decoding the user data, an efficiency problem arises when the number of data bits to be encoded by the high rate channel encoder is not integer divisible by m where the code rate of the channel ENDEC is m/n. Consider, for example, a high rate channel encoder 40 having a code rate of 64/65. If the number of input bits 12 to be encoded is not integer divisible by 64, then the last part of the data sector must be padded to reach a 64-bit input block. For example, if there are 4128 bits of input data 12, then the last input block must be padded with $$\mod(4128/64)=32$$

pad bits (zero bits) in order to encode the last 64/65 output block 42. These encoded pad bits are then written to the disk 22 which is a waste of storage area.

There is, therefore, a need for a more efficient channel ENDEC in a commuted read/write channel for disk storage systems. In particular, there is a need for a channel ENDEC which reduces or eliminates the number of pad bits when encoding the last part of a data sector.

SUMMARY OF THE INVENTION

The present invention may be regarded as a commuted read/write channel for writing data to and reading data from a disk storage medium. A first channel encoder encodes a first j-k bits of a j-bit data block to generate first encoded data, and an ECC encoder encodes the first encoded data and a remaining k-bits of the data block to generate ECC redundancy symbols comprising a plurality of bits. A second channel encoder encodes the remaining k-bits of the data block and the ECC redundancy symbols to generate second encoded data. The first encoded data and the second encoded data are then output as channel data written to the disk storage medium.

The present invention may also be regarded as a method of encoding data in a commuted read/write channel for disk storage systems. The method comprises the steps of first channel encoding a first j-k bits of a j-bit data block to generate first encoded data; ECC encoding the first encoded data and a remaining k-bits of the data block to generate ECC redundancy symbols comprising a plurality of bits; second channel encoding the remaining k-bits of the data block and the ECC redundancy symbols to generate second encoded data; and outputting the first encoded data and the second encoded data as channel data written to a disk storage medium.

BRIEF DESCRIPTION OF THE DRAWINGS

The above and other aspects and advantages of the present invention will be better understood by reading the following detailed description of the invention in conjunction with the drawings, wherein.

DETAILED DESCRIPTION OF EMBODIMENTS

Commuted Read/Write Channel

Figure 4:
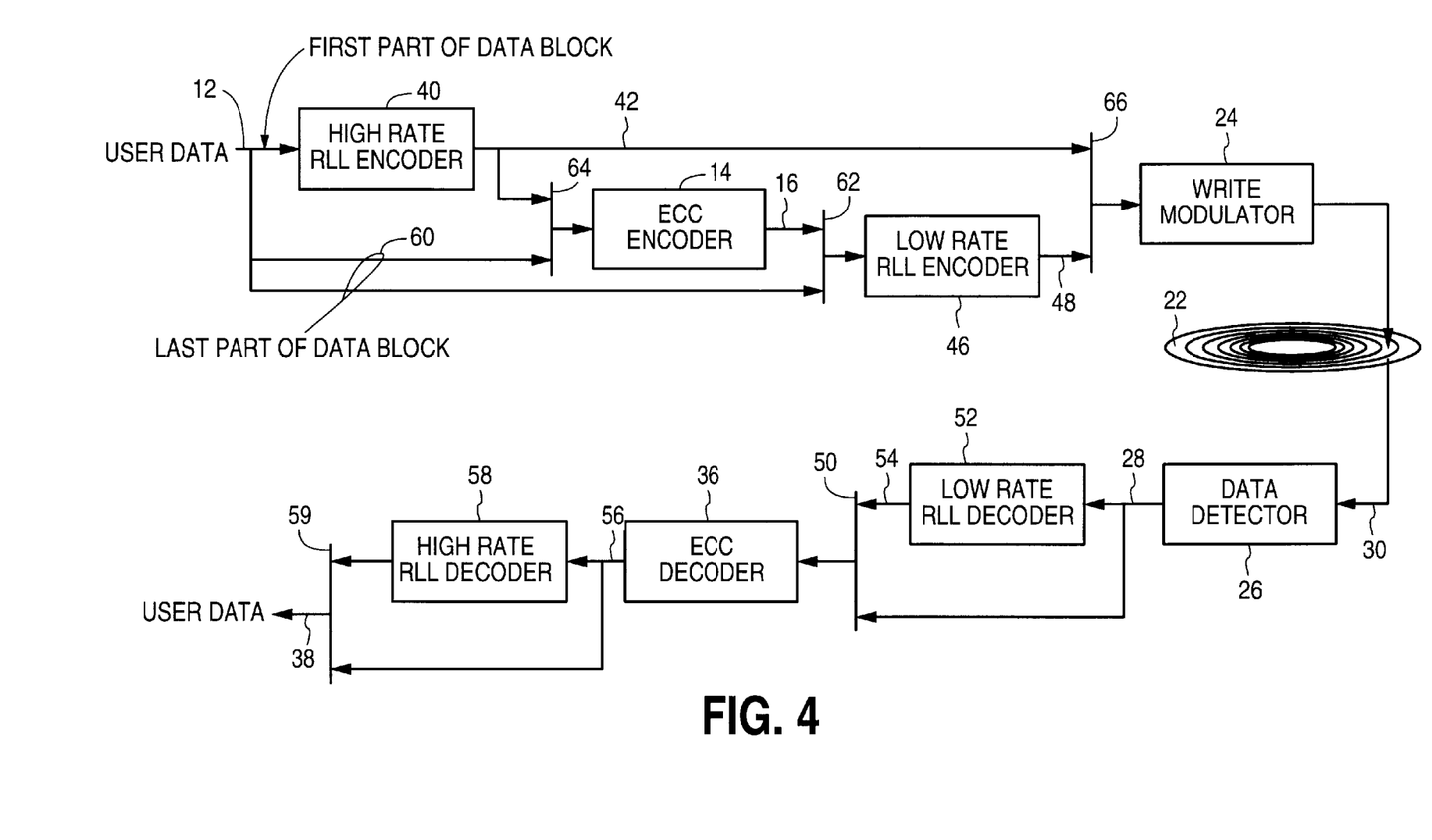
FIG. 4 is a block diagram of a commuted read/write channel according to one embodiment of the present invention wherein a first part of a data sector is encoded by a high rate channel encoder, and a last part of the data sector as well as the ECC redundancy symbols are encoded by a low rate channel encoder.

A commuted read/write channel according to one embodiment of the present invention is shown in FIG. 4. During a write operation, the user data 12 received from a host is written to a disk storage medium 22 (magnetic or optical) in predetermined sized data blocks. A first channel encoder 40, preferably implemented as a high rate RLL encoder 40, encodes a first j-k bits of a j-bit data block to generate first encoded data 42, and an ECC encoder 14 encodes the first encoded data 42 and a remaining k-bits of the data block 60 to generate ECC redundancy symbols 16 comprising a plurality of bits. A second channel encoder 46, preferably implemented as a low rate RLL encoder 46, encodes the remaining k-bits of the data block and the ECC redundancy symbols 16 to generate second encoded data 48. The first encoded data 42 and the second encoded data 48 are then output as channel data written to the disk storage medium 22.

During a read operation, a data detector 26 detects an estimated data sequence 28 from the read signal 30. The data detector 26 may be implemented using Partial Response (PR) equalization with Maximum Likelihood (ML) sequence detection as is well known in the art. The estimated data sequence 28 representing the first part of a data block encoded by the first channel encoder 40 passes directly through a multiplexer 50 and is input into the ECC decoder 36. The estimated data sequence 28 representing the last part of the data block 60 together with the encoded ECC redundancy symbols 16 encoded by the second channel encoder 46 are then decoded by a second channel decoder 52, such as a low rate RLL decoder 52, which implements the inverse operation of the second channel encoder 46. The data 54 output by the second channel decoder 52 passes through multiplexer 50 and is input into the ECC decoder 36 which detects and corrects errors in the estimated data sequence 28. The corrected user data sequence 56 representing the first part of the data block encoded by the first channel encoder 40 is then decoded by a first channel decoder 58, such as a high rate RLL decoder 58, which implements the inverse operation of the first channel encoder 40. The corrected data sequence 56 representing the last part of the data block 60 which has already been decoded using the second channel decoder 52 passes directly through multiplexer 59. The decoded user data 38 output by multiplexer 59 is then transmitted to the host.

Figure 5A:
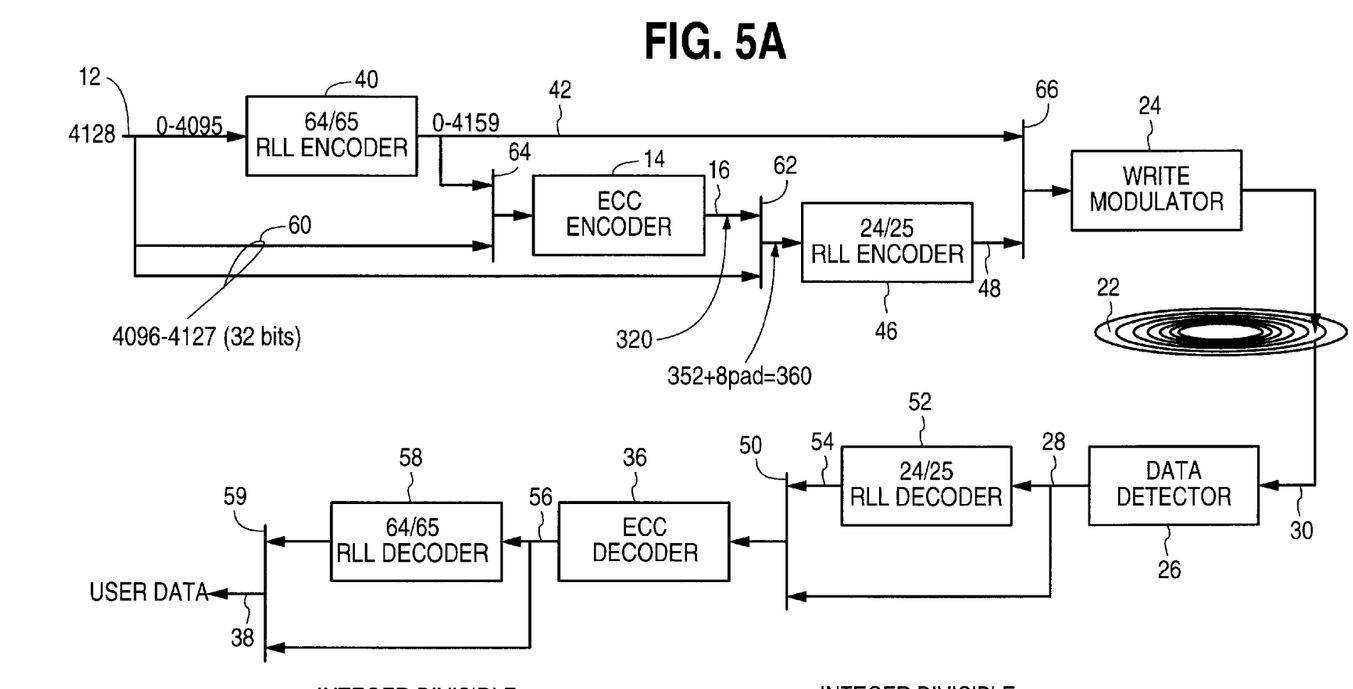
FIGS. 5A and 5B illustrate an embodiment of the present invention wherein the high rate channel ENDEC is a rate 64/65 channel ENDEC for encoding/decoding a first part of a data sector, and the low rate channel ENDEC is a rate 24/25 channel ENDEC for encoding/decoding a last part of the data sector and the ECC redundancy symbols.
Figure 5B:
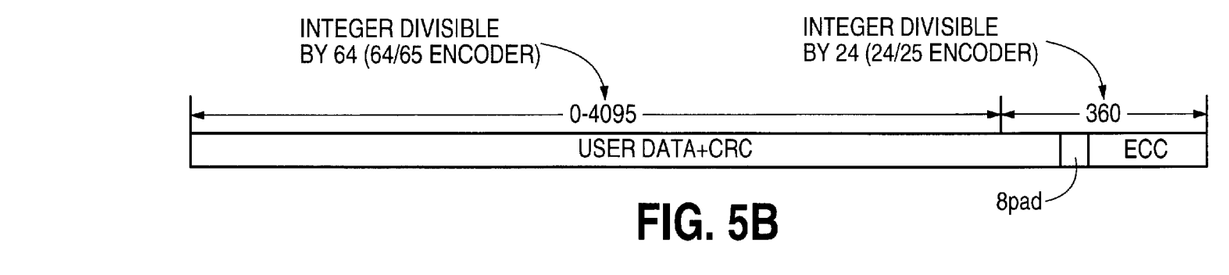

A more specific embodiment of the present invention is illustrated in FIG. 5A and 5B. In this embodiment, a data block to be written to the disk storage medium 22 is a data sector comprising 512 bytes of user data and 4 CRC check bytes for a total of 516 bytes or 4128 bits of input data 12. Also in this embodiment, the ECC encoder 14 generates 40 ECC redundancy symbols 16. The format of the data encoded by the channel encoders 40 and 46 is illustrated in FIG. 5B, with the corresponding circuitry illustrated in FIG. 5A. The first channel encoder 40 of FIG. 5A is implemented with a code rate of 64/65 and the first 4096 bits (integer divisible by 64) of input data 12 are encoded by the first channel encoder 40 to generate 4160 bits of first encoded data 42. Bits 4096–4127 (32 bits) 60 of the input data 12 pass through multiplexer 62 and are encoded by the second channel encoder 46. The 4160 bits of first encoded data 42 pass through multiplexer 64 and are input into the ECC encoder 14, and then the last 32 bits of input data 60 pass through multiplexer 64 and are input into the ECC encoder 14. The 320 bits of ECC redundancy symbols 16 pass through multiplexer 62 and are encoded by the second channel encoder 46. The first encoded data 42 passes through multiplexer 66 and is written to the disk storage medium 22 by a write modulator 24, followed by the second encoded data 48 passing through multiplexer 66 and written to the disk storage medium 22.

In the embodiment of FIG. 5A, the code rate of the second channel encoder 46 is 24/25. Because 24 does not integer divide into 352 (the last 32 bits 60 of the input data 12 plus the 320 bits of ECC redundancy symbols 16), 8 pad bits are added to the last input block of the second channel encoder 46 so that the last input block comprises 24 bits. That is, if the code rate of the second encoder 46 is m/n, then pad bits are added such that the number of bits in the last part of the data sector 60 plus the ECC redundancy symbols is integer divisible by m.

When reading a data sector from the disk storage medium 22, the first part of the data sector which was encoded by the 64/65 channel encoder 40 passes through multiplexer 50 and is input into an ECC decoder 36. The last part of the data sector and the ECC redundancy symbols 16 are decoded by a 24/25 channel decoder 52 which implements the inverse operation of the 24/25 channel encoder 46. The rate 24/25 decoded data 54 passes through multiplexer 50 and are input into the ECC decoder 36. Bits 0–4095 of the data sector are decoded by a 64/65 channel decoder 58 which implements the inverse operation of the 64/65 channel encoder 40. Bits 4096–4127 of the data sector, which have already been decoded by the 24/25 channel decoder 52, pass directly through multiplexer 59. The decoded user data 38 output by multiplexer 59 is then transmitted to the host.

Figure 6A:
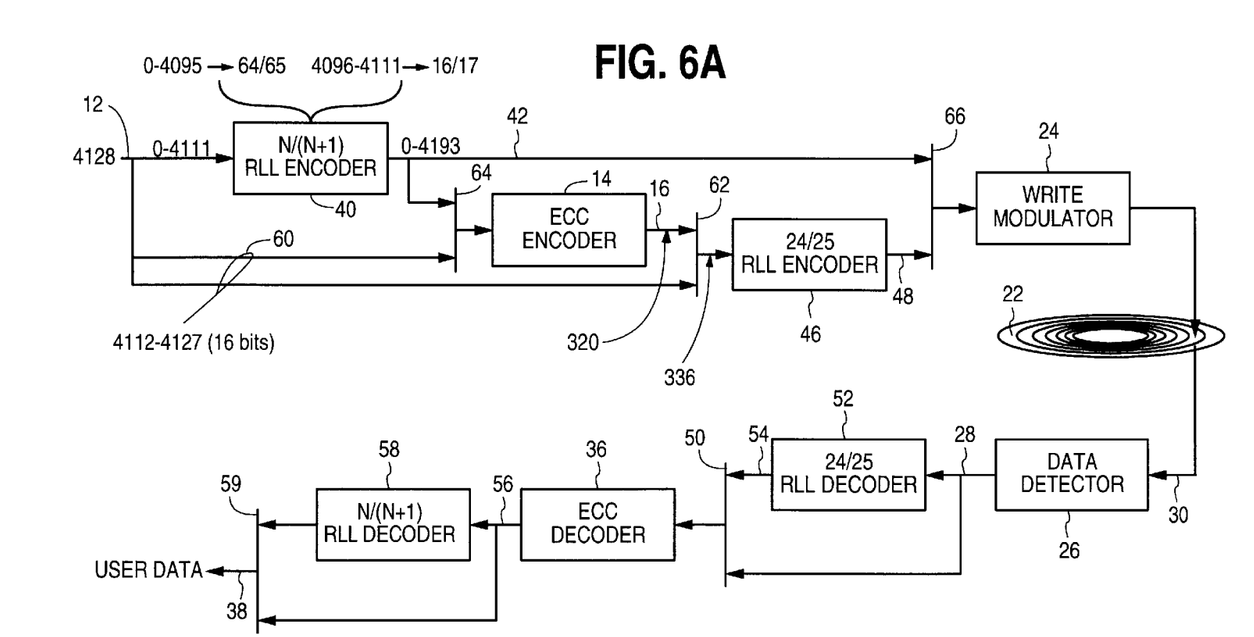
FIGS. 6A and 6B illustrate an alternative embodiment of the present invention wherein the high rate channel ENDEC is a N/(N+1) channel ENDEC for encoding/decoding a first part of a data sector using two different code rates, and the low rate channel ENDEC is a 24/25 channel ENDEC for encoding/decoding a last part of the data sector and the ECC redundancy symbols.
Figure 6B:
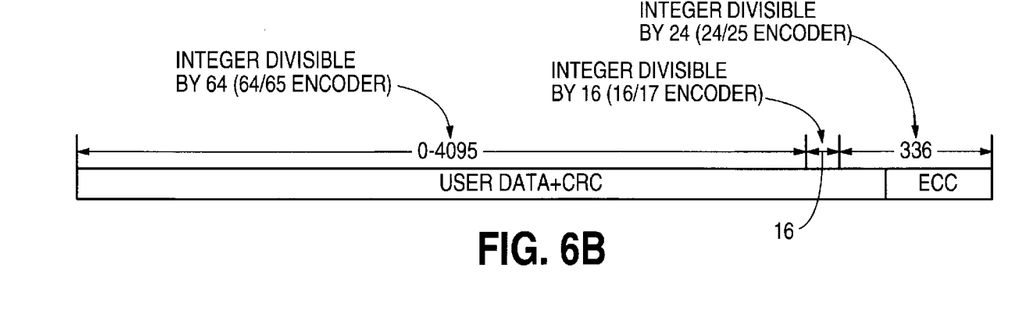

In an alternative embodiment of the present invention, illustrated in FIG. 6A and 6B, the first channel encoder 40 is programmable in that the code rate N/(N+1) can be adjusted for different values of N. This embodiment is more efficient because it eliminates the need for pad bits added to the last input block for the second encoder 46 (e.g., the 8 pad bits in FIG. 5B). The first encoder 40 is programmed to a code rate of 64/65 to encode bits 0–4095 (4096 is integer divisible by 64), and then it is programmed to a code rate of 16/17 to encode bits 4096–4111 (4112–4096=16 is integer divisible by 16). Bits 4112–4127 (16 bits) 60 of the input data 12 pass through multiplexer 62 and are encoded by the second channel encoder 46, followed by the 320 bits of ECC redundancy symbols. Because 24 integer divides into 336 (the last 16 bits 60 of the input data 12 plus the 320 bits of ECC redundancy symbols 16), pad bits are not added to the last input block of the 24/25 channel encoder 46 as in the embodiment of FIG. 5A.

When reading a data sector from the disk the commuted read/write channel of FIG. 6A operates essentially the same as that of FIG. 5A except that the N/(N+1) channel decoder 58 is programmed to decode bits 0–4096 at a code rate of 64/65 and bits 4096–4111 at a code rate of 16/17 to implement the inverse operation of the N/(N+1) channel encoder 40. Implementation details concerning a suitable embodiment for the programmable N/(N+1) channel encoder 40 and N/(N+1) channel decoder 58 of FIG. 6A are disclosed in the above referenced copending patent application entitled "A COST-EFFECTIVE HIGH-THROUGHPUT ENUMERA- TIVE ENDEC EMPLOYING A PLURALITY OF SEGMENTED COMPARE TABLES," the relevant sections of which are set forth below.

Enumerative Encoder—Full Compare Table

Figure 7:
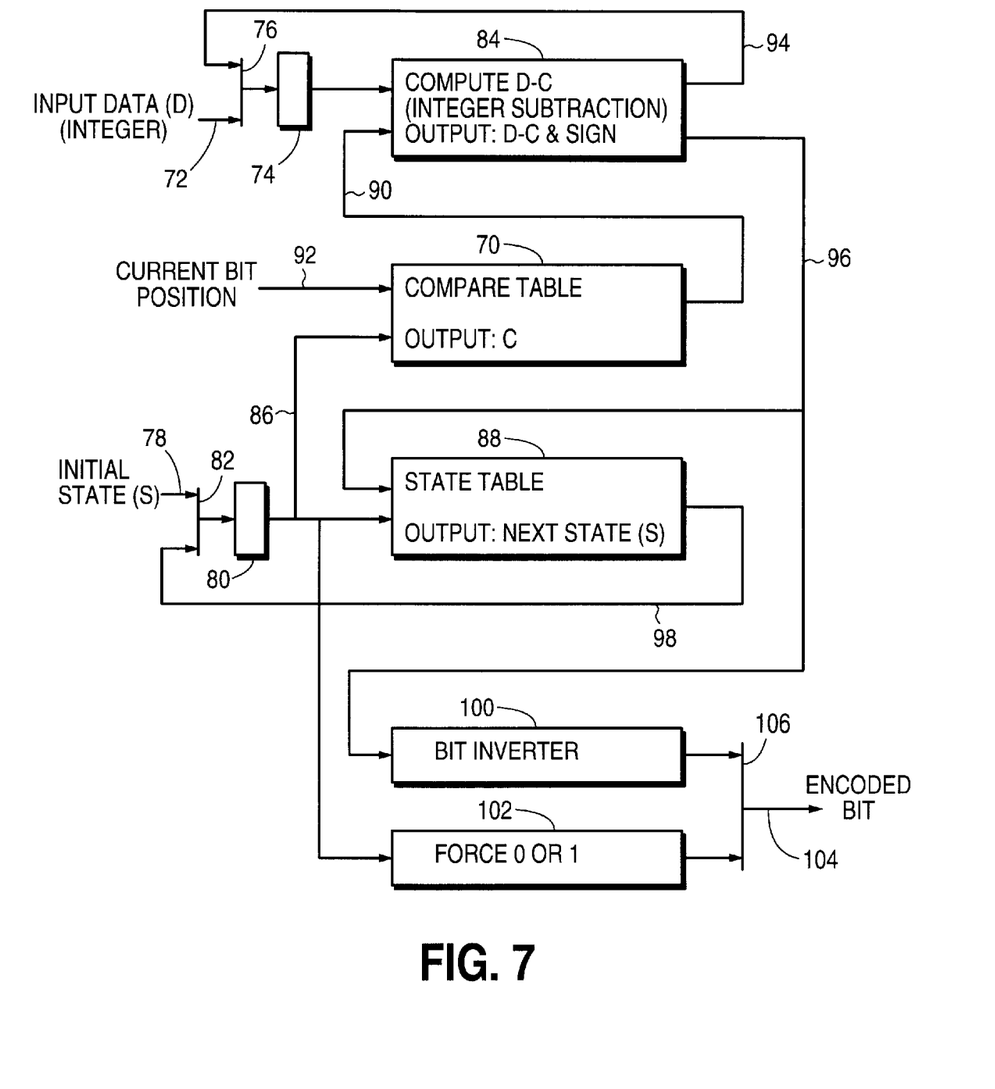
FIG. 7 shows an enumerative encoder implemented using a compare table representing a full enumerative trellis.

An overview of an enumerative encoder comprising a full compare table 70 of an enumerative trellis is shown in FIG. 7. To initialize the encoder, the input dataword 72 represented as an integer is loaded into register 74 through multiplexer 76, and an initial state 78 is loaded into register 80 through multiplexer 82. The output of register 74 is input into a D-C computation block 84, and the output of register 80 (the current state 86) is input into a state table 88.

At each branch in the enumerative trellis, the D-C computation block 84 computes the value D-C where D is the input data and C is the current state value which is provided by a compare table 70 over line 90. The compare table 70 generates the current state value C based on the current bit position 92 of the input data and the current state 86 of the enumerative trellis. The D-C computation block 84 outputs the subtraction value D-C 94 and a sign bit 96. The subtraction value D-C 94 is loaded back into register 74 through multiplexer 76 if the sign bit 96 is zero in order to update the input value D (i.e., if D is greater than C update the input value); otherwise, the input value D is unmodified.

The sign bit 96 is input into the state table 88 which responds by selecting the next state in the enumerative trellis. That is, if D-C is positive then the state table 88 selects the corresponding branch to the next state, otherwise the state table 88 selects the branch corresponding to a negative value. The selected state is output over line 98 and loaded into register 80 through multiplexer 82 so that it becomes the current state 86 for encoding the next input bit.

The sign bit 96 output by the D-C computation block 84 is inverted by inverter 100. If there is only one branch leaving the current state of the enumerative trellis, then a force circuit 102 forces the output bit 104 of the encoder to be a "0" or a "1"; otherwise the output of the inverter 100 is selected as the encoder output 104 through multiplexer 106.

Enumerative Decoder—Full Compare Table

Figure 8:
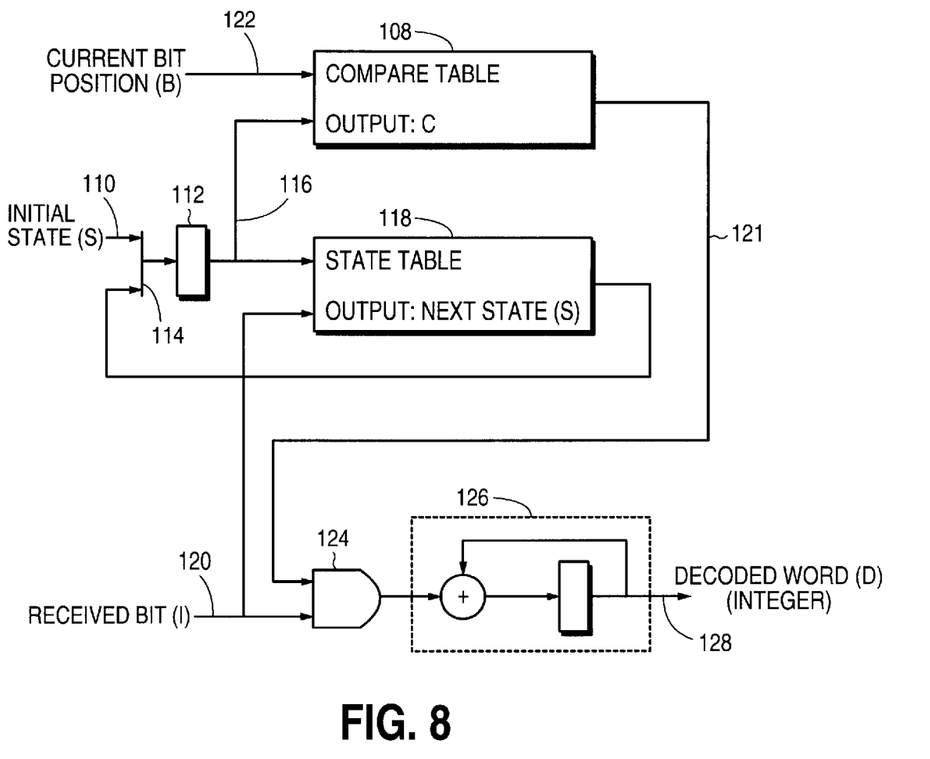
FIG. 8 shows an enumerative decoder implemented using a compare table representing a full enumerative trellis.

An overview of an enumerative decoder comprising a full compare table 108 of an enumerative trellis is shown in FIG. 8. To initialize the decoder, an initial state 110 is loaded into register 112 through multiplexer 114. The output 116 of register 112, which represents the current state, is input into a state table 118. The state table 118 in the decoder of FIG. 8 is the same as the state table 88 in the encoder of FIG. 7; the difference being that the decoder uses the current state 116 to construct an integer output value (dataword) based on the input codeword 120.

As each bit of the input codeword 120 is processed, the compare table 108 outputs a current state value 121 based on the current state 116 and the current bit position 122 of the input codeword 120. The state value 121 is applied to an AND gate 124; if the current bit of the input codeword 120 is a "1" bit, then the state value 121 is accumulated by accumulator 126, otherwise the state value 121 is ignored. The state table 118 updates the next state (via multiplexer 114 and register 112) based on the current input bit of the input codeword 120; that is, the branch corresponding to a "1" or "0" bit is selected. If there is only one branch leaving the current state, then the input bit of the input codeword 120 is ignored. Once the entire input codeword 120 has been processed, the entire enumerative trellis will have been traversed and the decoded dataword 128 is output by the accumulator 126.

Enumerative ENDEC—Segmented Compare Table

Encoding or decoding data on-the-fly at the channel rate using the enumerative ENDEC disclosed in FIG. 7 and FIG. 8 would require a k-bit subtraction (or addition) on every channel clock, where k is the number of bits in an input dataword. For example, a rate 64/65 enumerative ENDEC would require a 64-bit subtraction on every channel clock when encoding an input dataword. This is not practical for high speed communication channels, such as in disk storage systems.

One solution to this problem is to duplicate the ENDEC circuitry and process multiple codewords at a time. This reduces the clock rate of the ENDEC by CLK/n, where CLK is the channel clock and n is the number of duplicated ENDECs. However, duplicating the ENDEC circuitry is not cost effective, particularly when designing high rate codes.

Figure 9:
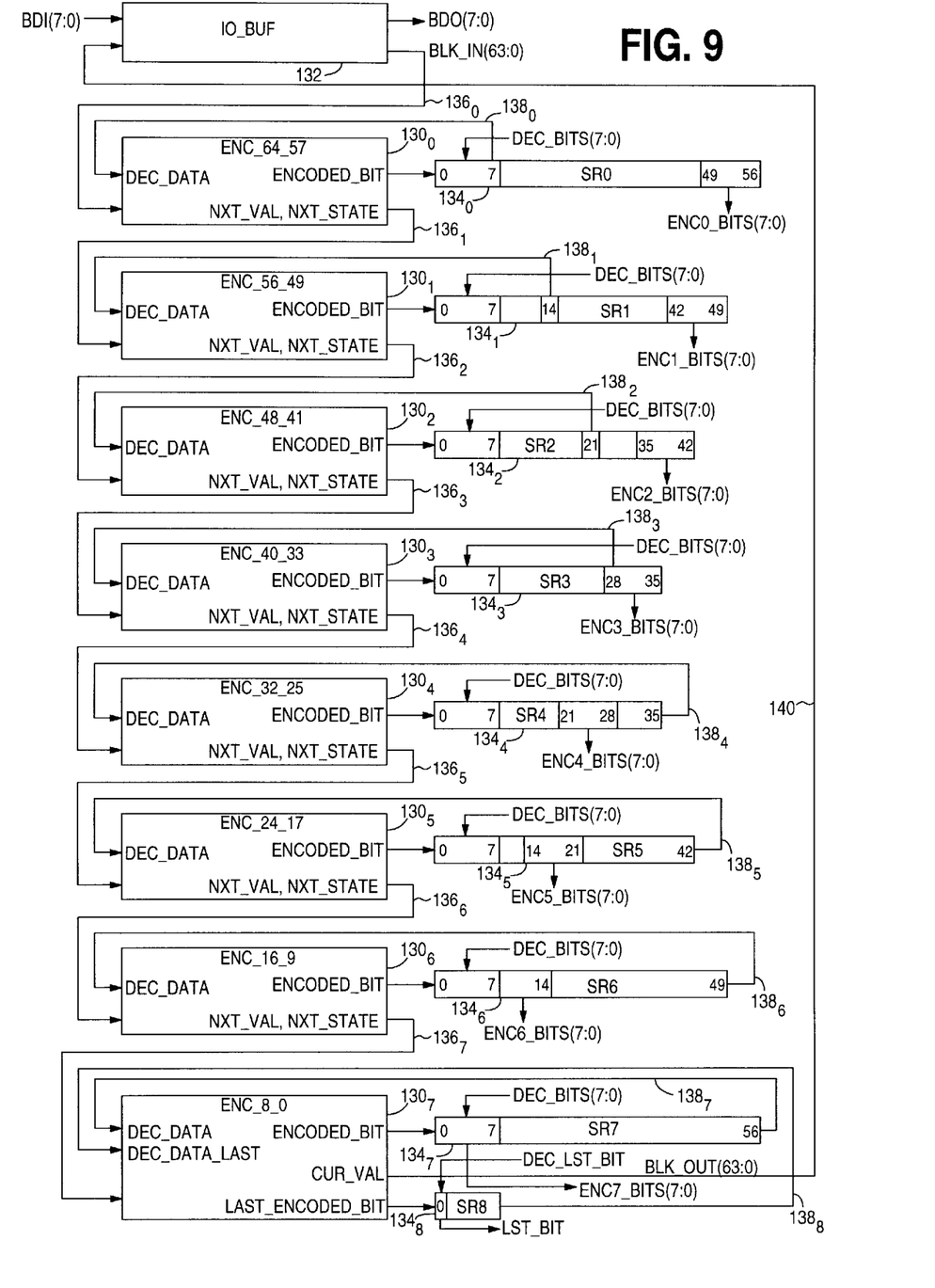
FIG. 9 shows an enumerative encoder/decoder (ENDEC) according to an embodiment of the present invention.

FIG. 9 shows an embodiment of the present invention which processes multiple codewords simultaneously without duplicating the ENDEC circuitry in its entirety. Instead, the full compare tables (70 and 108) of FIG. 7 and FIG. 8 are segmented into a plurality of segmented compare tables each of which represents a segment of the enumerative trellis and each of which operate on a corresponding segment of an input dataword.

The example embodiment of FIG. 9 implements a rate 64/65 enumerative ENDEC where the full compare table representing the full enumerative trellis has been sliced into eight segmented compare tables. Each segmented compare table is part of a slice circuit $130_0$–$130_7$ where each slice circuit $130_0$–$130_7$ comprises the same circuitry shown in FIG. 7 and FIG. 8 with the full compare table (70 and 108) replaced by a segmented compare table.

During encoding, the first seven slice circuits $130_0$–$130_6$ generate 56 bits of an output codeword (8 bits each) and the last slice circuit $130_7$ generates the last 9 bits of an output codeword. During decoding, the first seven slice circuits $130_0$–$130_6$ process 56 bits of an input codeword (8 bits each) and the last slice circuit $130_7$ processes the last 9 bits of an input codeword. During both encoding and decoding, the eight slice circuits $130_0$–$130_7$ operate on eight codewords simultaneously as explained in further detail below with reference to FIGS. 10A–11B. Thus, the clock rate of the enumerative ENDEC can operate at ⅛ the rate of the channel clock.

The buffer IO_BUF 132 in FIG. 9 stores the incoming data bits during the encoding process and the outgoing data bits during the decoding process. During encoding, on each ENDEC clock the IO_BUF 132 receives one byte (8 bits) of input data, and during decoding it outputs one byte of decoded output. Because the code rate is 64/65, after receiving 64 bytes during the encoding process there will be an extra byte ready to output. Thus, the input to IO_BUF 132 must pause for one ENDEC clock to allow this byte to be output. Similarly, during the decoding process there is only 64 bytes output for every 65 bytes recieved; therefore, the decoding output will stop for one ENDEC clock after every 64th output byte.

A plurality of shift registers SR0–SR8 $134_0$–$134_8$ are provided for storing the bits of the encoded output codewords during the encoding process, and for storing the bits of the encoded input codewords during a decoding process. During the encoding process, the first eight registers $134_0$–$134_7$ output the first 64 bits of the encoded codeword (8 bits from each register), and the last register $134_8$ outputs the 65th bit of the encoded codeword. After an initial delay, the codeword data begins to be transferred from the shift registers SR0–SR8 $134_0$–$134_8$ to the channel. During subsequent ENDEC clocks, one byte of the encoded codeword is transferred from the appropriate shift register SR0–SR8 $134_0$–$134_8$ to the channel. During the decoding process, on each ENDEC clock a byte of an input codeword is loaded into the corresponding register $134_0$–$134_7$ and the 65th bit is loaded into register $134_8$. After an initial delay, the last slice circuit $130_7$ outputs a 64-bit decoded output dataword on every 8th ENDEC clock which is transmitted over line 140 and stored in IO_BUF 132.

The size of the shift registers $134_0$–$134_8$ varies for each slice circuit $130_0$–$130_7$ and the amount of memory used in each register $134_0$–$134_8$ varies depending on whether the ENDEC is encoding or decoding. During encoding, the entire storage area is utilized in the first four registers $134_0$–$134_3$ and a decreasing amount of storage area is used in the next four registers $134_4$–$134_7$. During decoding, the situation is reversed as illustrated in FIG. 9. The size of the shift registers $134_0$–$134_8$ varies due to the overlapping method in which the codewords are encoded and decoded as will now be described.

During the encoding process, the IO_BUF 132 first receives eight bytes of input data during the first eight ENDEC clocks to form a 64-bit input dataword. The 64-bit input dataword is then transferred to the first slice circuit $130_0$ over line $136_0$. During the next eight ENDEC clocks, the first slice circuit $130_0$ computes bits 64–57 of the output codeword which are shifted serially into shift register SR0 $134_0$. Concurrently, the next eight input data bytes are input into IO_BUF 132 such that the next 64-bit input dataword is ready to be processed. On the next clock cycle, the first slice circuit $130_0$ transfers a next value NXT_VAL and a next state NXT_STATE to the second slice $130_1$ over line $130_1$. The NXT_VAL represents the current state value input into the D-C computation block (conceptually, the value stored in register 74 of FIG. 7). The NXT_STATE represents the current state in the enumerative trellis after processing the first eight bits (conceptually, the value stored in register 80 of FIG. 7). Concurrently, the next 64-bit input dataword is transferred from the IO_BUF 132 to the first slice circuit $130_0$ over line $136_0$. During the next eight ENDEC clock cycles, the following operations are performed concurrently:
 1. the next eight input data bytes are input into IO_BUF 132 such that the next 64-bit input dataword is ready to be processed;
 2. the first slice circuit $130_0$ computes bits 64–57 of the next output codeword which are shifted serially into shift register SR0 $134_0$; and
 3. the second slice circuit $130_1$ computes bits 56–49 of the first output codeword which are shifted serially into shift register SR1 $134_1$.

On the eighth ENDEC clock, the NXT_VAL and NXT_STATE values are shifted from the current slice circuits $130_0$–$130_6$ to the following slice circuits $130_1$–$130_7$ and the above process is reiterated. This process continues for 64 ENDEC clocks after which the output registers SR0–SR8 $134_0$–$134_8$ receive the entire 65-bit output codeword for the first codeword, as well as portions of the following codewords. Note that on the 64th ENDEC clock, the last two bits (bits 0 and 1) of the 65-bit output codeword are generated. After 57 bits have been shifted into SR0 $134_0$, outputting to the channel begins. At this point, the first byte of the first codeword is stored in SR0(49:56), the second byte is stored in SR1(41:48), the seventh byte is stored in SR6(1:8), and the first bit of the last byte is stored in SR7(0). Registers SR0–SR8 $134_0$–$134_8$ continue to shift during outputting to the channel so that the output from SR1 $134_1$ is read from SR1(42:49) since it is read one ENDEC clock after the byte from SR0 $134_0$ is read. The output from SR6 $134_6$ is read from SR6(7:14) since it is taken six ENDEC clocks after SR0 $134_0$ is read. As explained above, on every 64th ENDEC clock the input into IO_BUF 132 is paused for one ENDEC clock to allow the extra encoded byte to be transferred from the shift registers SR0–SR8 $134_0$–$134_8$ to the channel.

Figure 10A:
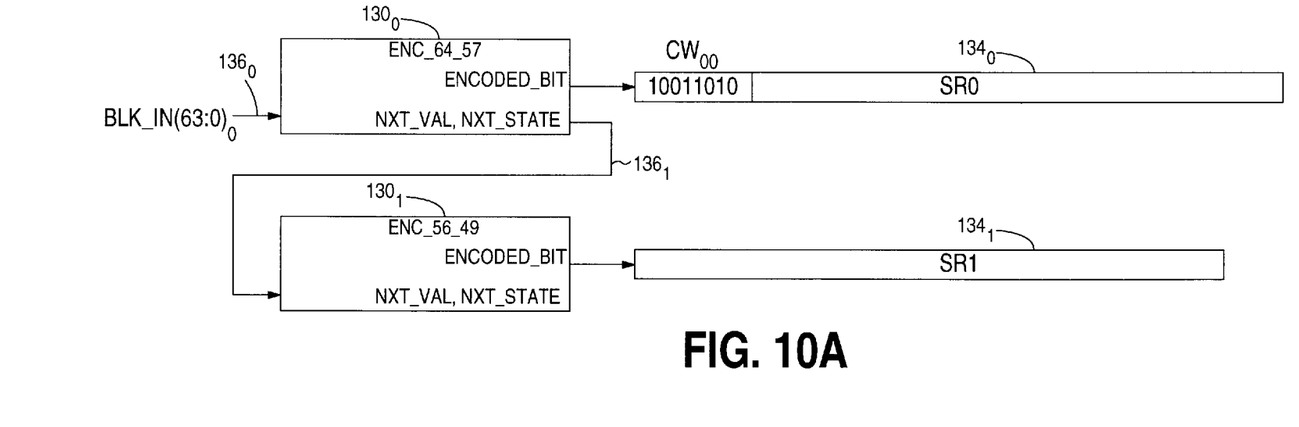
FIGS. 10A and 10B illustrate the encoding operation of the enumerative ENDEC of FIG. 9.
Figure 10B:
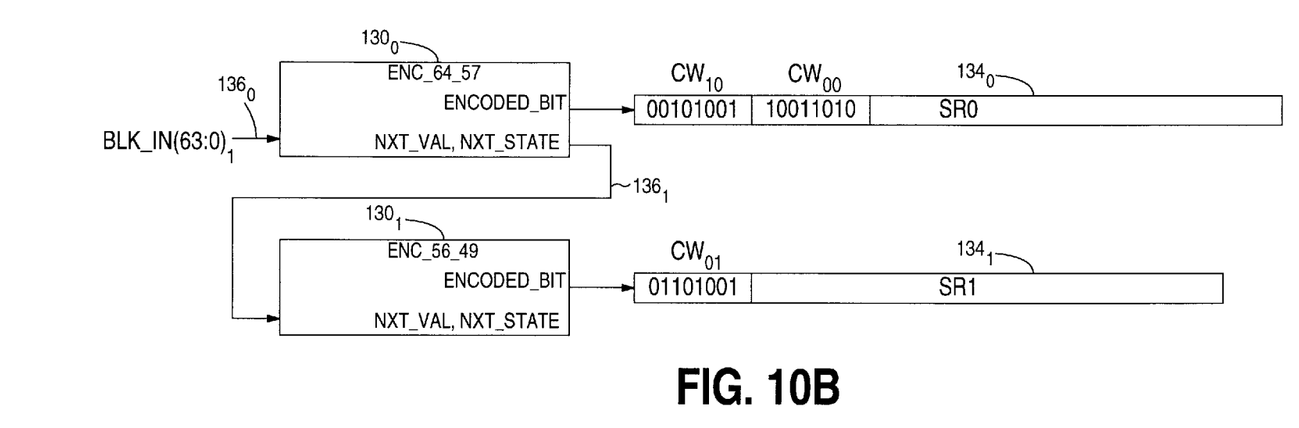
Figure 11A:
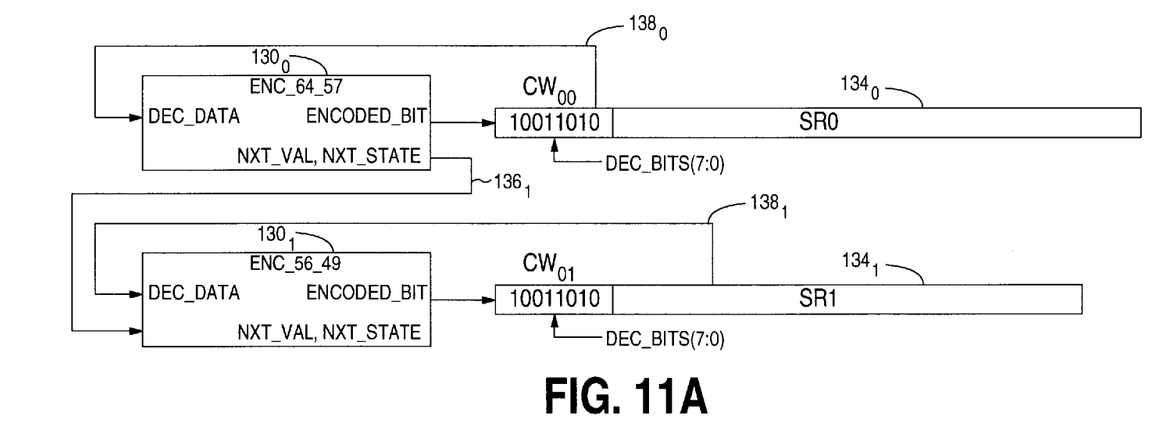
FIGS. 11A and 11B illustrate the decoding operation of the enumerative ENDEC of FIG. 9.
Figure 11B:
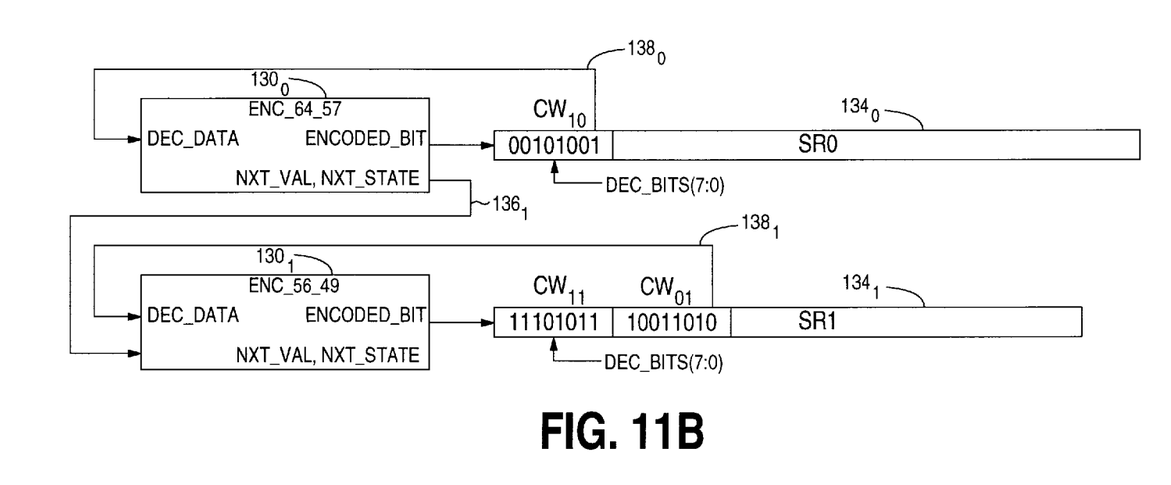

The encoding process is further understood with reference to FIGS. 10A and 10B which illustrate the encoding operation for two consecutive input datawords. In FIG. 10A, the first input dataword has been processed by the first slice circuit $130_0$ for eight ENDEC clocks to generate the first byte of the first output codeword (denoted $CW_{00}$) which has been shifted into shift register SR0 $134_0$. On the eighth ENDEC clock, the NXT_VAL and NXT_STATE values are transferred to the second slice circuit $130_1$ concurrent with the next input codeword being loaded into the first slice circuit $130_0$. As illustrated in FIG. 10B, during the next eight ENDEC clocks the first slice circuit $130_0$ computes the first byte of the next output codeword (denoted $CW_{10}$) which is shifted into shift register SR0 $134_0$ concurrent with the second slice circuit $130_1$ computing the second byte of the first output codeword (denoted $CW_{01}$) which is shifted into shift register SR1 $134_1$. The slice circuits $130_0$–$130_6$ then transfer the NXT_VAL and NXT_STATE values to the following slice circuits $130_1$–$130_7$ and the process continues.

During the decoding process, the data bits received from the channel are stored in the shift registers SR0(0:7)–SR8(0:7) starting with SR0(0:7). The first byte of a received codeword is stored in SR0(0:7) on the first ENDEC clock, the next byte is stored in SR1(0:7) on the next ENDEC clock, and so on. After the first byte of a received codeword is loaded into register SR0(0:7) then during the next eight ENDEC clock cycles the bits are shifted serially over line $138_0$ from SR0(7) into the first slice circuit $130_0$ for decoding (concurrent with loading shift registers SR1(0:7)–SR8(0:7) $134_1$–$134_8$ with the subsequent bytes of the received codeword). On the eighth ENDEC clock, the result of decoding the first byte of the received codeword (the accumulated value NXT_VAL and the ending state NXT_STATE) are transferred to the next slice circuit $130_1$ over line $130_1$. Conceptually, the NXT_VAL corresponds to the value accumulated in accumulator 126 of FIG. 8, and the NXT_STATE corresponds to the value stored in register 112 of FIG. 8. During the next eight ENDEC clock cycles, the following operations are performed concurrently:
 1. the next eight bytes for the next received codeword are input into the shift registers SR0(0:7)–SR8(0:7) $134_0$–$134_8$;
 2. the first slice circuit $130_0$ decodes the first byte of the next codeword; and
 3. the second slice circuit $130_1$ decodes the second byte of the first received codeword using the NXT_VAL and NXT_STATE values computed by the first slice circuit $130_0$ for the first byte and transferred over line $130_1$.

On the next ENDEC clock, the NXT_VAL and NXT_STATE values are shifted from the current slice circuits $130_0$–$130_6$ to the following slice circuits $130_1$–$130_7$ and the above process is reiterated. This process continues for 64 ENDEC clocks after which the last slice circuit $130_7$ contains the accumulated value for the integer representing the first decoded dataword; this value CUR_VAL is transferred over line 140 to the IO_BUF 132. On every 8th ENDEC clock thereafter, the last slice circuit 130$_7$ outputs the integer value CUR_VAL for a next decoded dataword.

The decoding process is further understood with reference to FIG. 7A and 7B which illustrate the decoding operation for two consecutive received codewords. In FIG. 7A, the first byte of a received codeword (denoted CW$_{00}$) has been stored in register SR0(0:7) 134$_0$ on the first ENDEC clock and the second byte (denoted CW$_{01}$) has been stored in register SR1(0:7) 134$_1$ on the second ENDEC clock. Also on the second ENDEC clock, the first slice circuit 130$_0$ processes the first bit of the first byte CW$_{00}$ from SR0(7) to begin the decoding process. As shown in FIG. 7B, after eight ENDEC clocks the first slice circuit 130$_0$ has finished decoding the first byte CW$_{00}$ of the received codeword and transfers over line 136$_1$ the NXT_VAL and the NXT_STATE values to the next slice circuit 130$_1$. Concurrently, the first byte of the next codeword (denoted CW$_{10}$) is loaded into register SR0(0:7) 134$_0$. On the next ENDEC clock the second byte of the next codeword (denoted CW$_{11}$) is loaded into register SR1(0:7) 134$_1$ and the second slice circuit 130$_1$ processes the first bit of the second byte CW$_{01}$ in the first codeword from SR1(14). After eight ENDEC clocks the slice circuits 130$_0$–130$_6$ transfer the NXT_VAL and NXT_STATE values to the following slice circuits 130$_1$–130$_7$ and the process continues.

The following is a glossary of terms used in FIG. 9:

BDI(7:0)—Incoming data from the buffer encoding. This data is byte transferred to IO_BUF 132 to construct the 64-bit input codewords.

BLK_IN(63:0)—A 64-bit input dataword transferred from IO_BUF 132 to the first slice circuit 130$_0$ during the encoding operation.

SR0–SR7—The shift registers 134$_0$–134$_7$ of varying length (SR0=57 bits; SR1=50 bits; SR2=43 its; SR3=36 its; SR4=36 its; SR5=43 bits; SR6=50 bits; SR7=57 bits) . Each shift register has a parallel load into bits (0:7) for inputting data for decoding, and an 8-bit parallel output from varying points within the registers for offloading the encoded data at the appropriate time.

SR8—The 8-bit shift register 134$_8$ which accumulates the 65th bit during the encoding operation, and which stores the 65th bit during the decoding operation.

DEC_BITS (7:0)—Data bytes received from the channel during a read operation which are stored in the shift registers SR0–SR7(0:7) 134$_0$–134$_7$.

DEC_LST_BIT—The 65th bit of a received codeword during decoding which is stored in shift register SR8 134$_8$.

ENC*_BITS(7:0)—The encoded data bytes transferred from the shift registers SR0–SR7 134$_0$–134$_7$ to the channel during a write operation.

BLK_OUT(63:0)—A 64-bit decoded dataword output by the last slice circuit 130$_7$ during the decoding operation.

BDO (7:0)—The decoded data output from IO_BUF 132 a byte at a time.

ENC_8_0 through ENC_64_57—The eight slice circuits 130$_0$–130$_7$ where the numerals refer to the bit positions of an input dataword encoded by each slice.

Rate 64/65 State Transition Table

Figure 12:
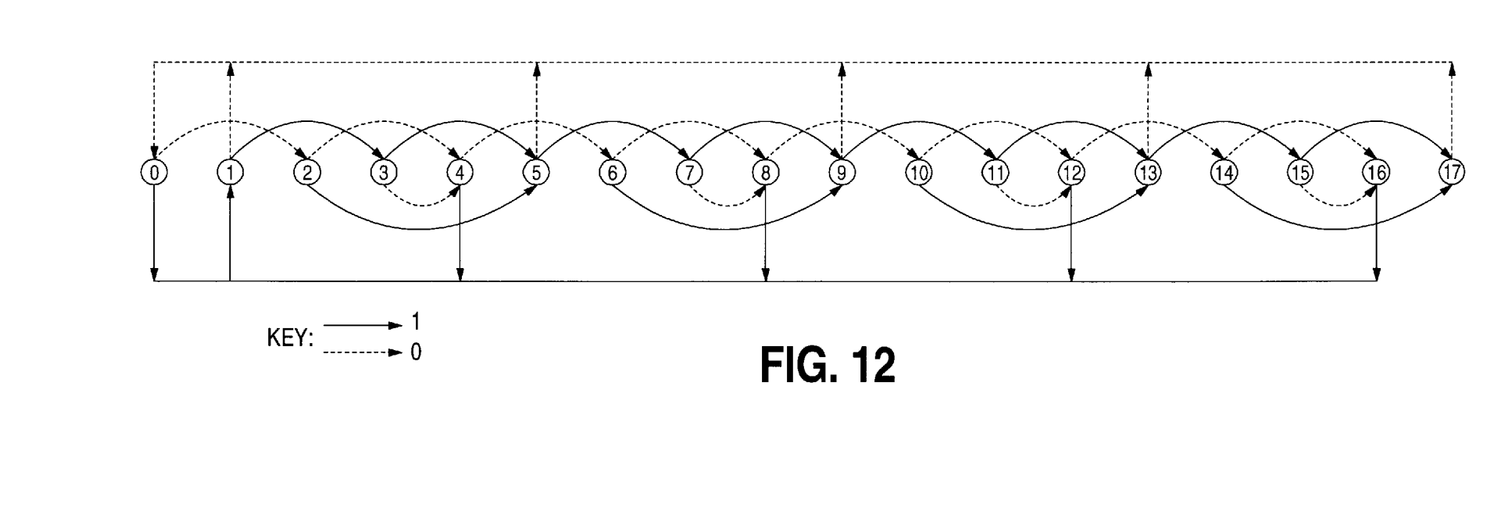
FIG. 12 is a state transition diagram for a rate 64/65 channel code implemented by the enumerative ENDEC of FIG. 9.

A state transition diagram for a rate 64/65 code is shown in FIG. 12. A corresponding enumerative trellis can be constructed from this state transition diagram using well known techniques. The segmented compare tables in the slice circuits 130$_0$–130$_7$ of FIG. 9 are then constructed by slicing the enumerative trellis into eight segments.

Rate NI(N+1) Enumerative ENDEC

The example embodiment of the enumerative ENDEC illustrated in FIG. 9 implements a rate 64/65 code. However, the circuitry can be modified to accomodate any code rate and the enumerative trellis can be segmented arbitrarily rather than on byte boundaries. Furthermore, the circuitry of FIG. 9 could be modified to shorten the code rate on-the-fly to accomodate different code rates by bypassing a selected number of the encoding/decoding sections. For the implementation shown in FIG. 9, it is convenient to shorten the code rate by a multiple of 8. For example, to shorten the ENDEC to a code rate of 56/57, the input data to be encoded and the received data to be decoded would be sent directly to the slice circuit ENC_56_49 130$_1$. Alternatively, the input data and received data could be sent directly to the slice circuit ENC_8_0 130$_7$ which would implement a rate 8/9 code. Thus, the enumerative ENDEC illustrated in FIG. 9 may be implemented as a rate N/(N+1) ENDEC in order to implement the rate N/(N+1) channel encoder 40 and the rate N/(N+1) channel decoder 58 of FIG. 6A.

The objects of the invention have been fully realized through the embodiments disclosed herein. Those skilled in the art will appreciate that the various aspects of the invention can be achieved through different embodiments without departing from the essential function. For example, code rates other than the disclosed 64/65, 24/25 and 16/17 could be employed. The disclosed embodiments are thus illustrative and not intended to limit the scope of the present invention as appropriately construed from the following claims.

We claim:

1. A commuted read/write channel for writing data to and reading data from a disk storage medium, comprising:
    (a) a first channel encoder for encoding a first j-k bits of a j-bit data block to generate first encoded data;
    (b) an ECC encoder for encoding the first encoded data and a remaining k-bits of the data block to generate ECC redundancy symbols comprising a plurality of bits;
    (c) a second channel encoder for encoding the remaining k-bits of the data block and the ECC redundancy symbols to generate second encoded data; and
    (d) an output for outputting the first encoded data and the second encoded data as channel data written to the disk storage medium.

2. The commuted read/write channel as recited in claim 1, wherein a code rate of the first channel encoder is greater than a code rate of the second channel encoder.

3. The commuted read/write channel as recited in claim 1, wherein the first channel encoder is an enumerative encoder.

4. The commuted read/write channel as recited in claim 3, wherein the enumerative encoder has a programmable code rate.

5. The commuted read/write channel as recited in claim 4, wherein:
    (a) the first channel encoder encodes a first part of the j-k bits of the data block according to a first code rate of $m_0/n_0$; and
    (b) the first channel encoder encodes a last part of the j-k bits of the data block according to a second code rate of $m_1/n_1$.

6. The commuted read/write channel as recited in claim 5, wherein:
    (a) the first part of the j-k bits of the data block is integer divisible by $m_0$; and
    (b) the last part of the j-k bits of the data block is integer divisible by the $m_1$.

7. The commuted read/write channel as recited in claim 5, wherein:
   (a) the second channel encoder encodes $m_2$ bits of input data into $n_2$ bits of output data; and
   (b) the bits of the ECC redundancy symbols plus the k-bits of the data block is integer divisible by $m_2$.

8. A method of encoding data in a commuted read/write channel for disk storage systems, comprising the steps of:
   (a) first channel encoding a first j-k bits of a j-bit data block to generate first encoded data;
   (b) ECC encoding the first encoded data and a remaining k-bits of the data block to generate ECC redundancy symbols comprising a plurality of bits;
   (c) second channel encoding the remaining k-bits of the data block and the ECC redundancy symbols to generate second encoded data; and
   (d) outputting the first encoded data and the second encoded data as channel data written to a disk storage medium.

9. The method as recited in claim 8, wherein a code rate of the first channel encoding step is greater than a code rate of the second channel encoding step.

10. The method as recited in claim 8, wherein the first channel encoding step comprises the step of enumerative encoding.

11. The method as recited in claim 10, wherein the step of enumerative encoding comprises the step of programming a code rate.

12. The method as recited in claim 11, wherein the first channel encoding step comprises the steps of:
   (a) encoding a first part of the j-k bits of the data block according to a first code rate of $m_0/n_0$; and
   (b) encoding a last part of the j-k bits of the data block according to a second code rate of $m_1/n_1$.

13. The method as recited in claim 12, wherein:
   (a) the first part of the j-k bits of the data block is integer divisible by $m_0$; and
   (b) the last part of the j-k bits of the data block is integer divisible by the $m_1$.

14. The method as recited in claim 12, wherein:
   (a) the second channel encoding step comprises the step of encoding $m_2$ bits of input data into $n_2$ bits of output data; and
   (b) the bits of the ECC redundancy symbols plus the k-bits of the data block is integer divisible by $m_2$.

15. A commuted read/write channel for transmitting data through a communication medium, comprising:
   (a) a first channel encoder for encoding a first j-k bits of a j-bit data block to generate first encoded data;
   (b) an ECC encoder for encoding the first encoded data and a remaining k-bits of the data block to generate ECC redundancy symbols comprising a plurality of bits;
   (c) a second channel encoder for encoding the remaining k-bits of the data block and the ECC redundancy symbols to generate second encoded data; and
   (d) an output for outputting the first encoded data and the second encoded data as channel data transmitted through the communication medium.

16. The commuted read/write channel as recited in claim 15, wherein a code rate of the first channel encoder is greater than a code rate of the second channel encoder.

17. The commuted read/write channel as recited in claim 15, wherein the first channel encoder is an enumerative encoder.

18. The commuted read/write channel as recited in claim 17, wherein the enumerative encoder has a programmable code rate.

19. The commuted read/write channel as recited in claim 18, wherein
   (a) the first channel encoder encodes a first part of the j-k bits of the data block according to a first code rate of $m_0/n_0$; and
   (b) the first channel encoder encodes a last part of the j-k bits of the data block according to a second code rate of $m_1/n_1$.

20. The commuted read/write channel as recited in claim 19, wherein:
   (a) the first part of the j-k bits of the data block is integer divisible by $m_0$; and
   (b) the last part of the j-k bits of the data block is integer divisible by $m_1$.

21. The commuted read/write channel as recited in claim 19, wherein:
   (a) the second channel encoder encodes $m_2$ bits of input data into $n_2$ bits of output data; and
   (b) the bits of the ECC redundancy symbols plus the k-bits of the data block is integer divisible by $m_2$.

22. A method of encoding data in a commuted read/write channel for transmitting data through a communication medium, comprising the steps of:
   (a) first channel encoding a first j-k bits of a j-bit data block to generate first encoded data;
   (b) ECC encoding the first encoded data and a remaining k-bits of the data block to generate ECC redundancy symbols comprising a plurality of bits;
   (c) second channel encoding the remaining k-bits of the data block and the ECC redundancy symbols to generate second encoded data; and
   (d) outputting the first encoded data and the second encoded data as channel data transmitted through the communication medium.

23. The method as recited in claim 22, wherein a code rate of the first channel encoding step is greater than a code rate of the second channel encoding step.

24. The method as recited in claim 22, wherein the first channel encoding step comprises the step of enumerative encoding.

25. The method as recited in claim 24, wherein the step of enumerative encoding comprises the step of programming a code rate.

26. The method as recited in claim 25, wherein the first channel encoding step comprises the steps of:
   (a) encoding a first part of the j-k bits of the data block according to a first code rate of $m_0/n_0$; and
   (b) encoding a last part of the j-k bits of the data block according to a second code rate of $m_1/n_1$.

27. The method as recited in claim 26, wherein:
   (a) the first part of the j-k bits of the data block is integer divisible by $m_0$; and
   (b) the last part of the j-k bits of the data block is integer divisible by the $m_1$.

28. The method as recited in claim 26, wherein:
   (a) the second channel encoding step comprises the step of encoding $m_2$ bits of input data into $n_2$ bits of output data; and
   (b) the bits of the ECC redundancy symbols plus the k-bits of the data block is integer divisible by $m_2$.

* * * * *